United States Patent Office 3,396,850
Patented Aug. 13, 1968

3,396,850
DEVICE FOR SEPARATION AND FRACTIONA-
TION OF MATERIAL DISSOLVED OR SUS-
PENDED IN A LIQUID
Josef Kubát and Carel Pattyranie, Solna, Douglas
Wahren, Roslags Nasby, Karl Erik Almin, Saltsjo-
baden, Olle Andersson, Solna, and Frans Johanson,
Akersberga, Sweden, assignors to Rederiaktiebolaget
Nordstjernan, Axel Johnson Institut for Industri-
forskning I Nynashamn, a corporation of Sweden
Filed Nov. 18, 1965, Ser. No. 517,491
Claims priority, application Sweden, Mar. 1, 1965,
2,634/65
23 Claims. (Cl. 210—322)

ABSTRACT OF THE DISCLOSURE

An apparatus for separation and fractionation of material dissolved or suspended in a liquid, which apparatus utilizes the accumulation effect obtained as a consequence of the relative motion between such liquid and a casing which encloses such liquid to achieve such fractionation and separation. Such apparatus comprises a casing consisting of at least one channel having an entrance end provided with means for obtaining flow through said channel by periodically admitting to the entrance, plugs of a liquid having material dissolved or suspended therein, said plugs being separated by quantities of another phase, and an end provided with a fraction-collector means for selectively collecting fractions of varying concentration obtained by the accumulation effect of each separated liquid plug.

---

It is known that a certain amount of separation occurs when a system consisting of suspended or dissolved material in a liquid is made to flow through a surrounding conduit or, in the general case, when such a system has a relative motion relative to a fixed body. One observes in this case a lowering of the concentration of the dissolved or suspended material next to the solid body along which the flow occurs. It is also known that an accumulation of particles accurs at the leading end of a limited length of suspension which is made to flow through a casing, for instance a tube. Arrangements where a casing, for instance a tube or a channel, is moved relative to a liquid grossly at rest give an accumulation of material directed against the direction of motion of the casing.

The present invention concerns an arrangement for separation and fractionation of material suspended or dissolved in a liquid where the above effect is used. Examples of systems where separation covered by the invention occurs are:

Reclamation of fibrous material from effluents from pulp and paper mills. Separation of fibres suitable for re-use from non-desired fibre fragments and other particles.

Purification of effluents from pulp and paper mills.

Purification of city and community sewage and other industrial effluents.

Fractionation of mixtures of short and long fibres in suspension, for instance separation of sulphite fibres from groundwood fibres in the reclamation of waste paper.

Increasing the concentration or fractionation of colloidal systems or solutions of low or high polymer substances.

Increasing the concentration or fractionation of biochemical systems such as suspensions, containing cultures of yeast or Penicillium fungi.

It is known that separation and fractionation effects can be obtained in the above system using, for instance, sedimentation, centrifuging, filtration, flotation, or screening processes. In spite of the fact that a large number of unit processes for separation or fractionation of dissolved or suspended material in a liquid are at hand, it has not been possible using these methods to solve all purification and separation problems. One example of disturbances that can occur is filter clogging, especially in processing colloidal and gelling materials. Difficulties can also arise using sedimentation or centrifugation processes in systems where the two phases have approximately the same density. It is worth noting that in flotation processes chemicals are needed which may produce difficulties in the later processing and use of the product.

The above mentioned difficulties and disturbances are eliminated in an apparatus according to the present invention and the degree of purification obtained is comparatively high.

The apparatus according to the present invention, which uses the accumulating effect obtained from the relative motion of the suspension and the contained casing, is characterized mainly by the casing being in the shape of one or several tubes or channels so arranged that the suspension and another phase consisting of a gas, fluid or solid material periodically is fed into the pipe or channel mouths in order to obtain a flow of the suspension through the channels or pipes, the different parts of the suspension being separated by the other phase, and by the arrangement of a fraction collector at the other end of the channels in order to accept the different fractions obtained from the accumulation effect in each suspension part separated from the other suspension parts by the abovementioned other phase.

When the casing consists of several pipes or channels and when the relative motion to obtain the accumulation effect is obtained by the flow of the suspension relative to the casing, the pipes or channels should preferably consist of parallel straight tubes which can rotate around a common shaft arranged parallel to the tubes and in which arrangement the tubes extend from an entrance chamber for the suspension.

When the casing consists of only one channel and the relative motion to obtain the accumulation effect is obtained from the motion of the casing relative to the suspension, the tube or channel can consist of a helix shaped tube arranged so that it can be rotated around the helix axis and one end of which is submerged in the suspension during a part of each revolution.

In a modification of the above mentioned arrangement, that is when the casing consists of a channel and when the relative motion to obtain the accumulation effect is obtained by the motion of the casing relative to the suspension, the casing consists according to the invention of an annulus shaped channel formed between two concentrically arranged cylinders, at least one of which can be rotated, whereby the suspension, shaped as an annulus sector, passes through the channel forming fractions, which are collected in a fraction collector, preferably arranged at the plane end wall of the cylinders.

The invention will be described in more detail in the following and references made to the attached drawing, which somewhat schematically shows examples of designs of the invention.

Figure 1:
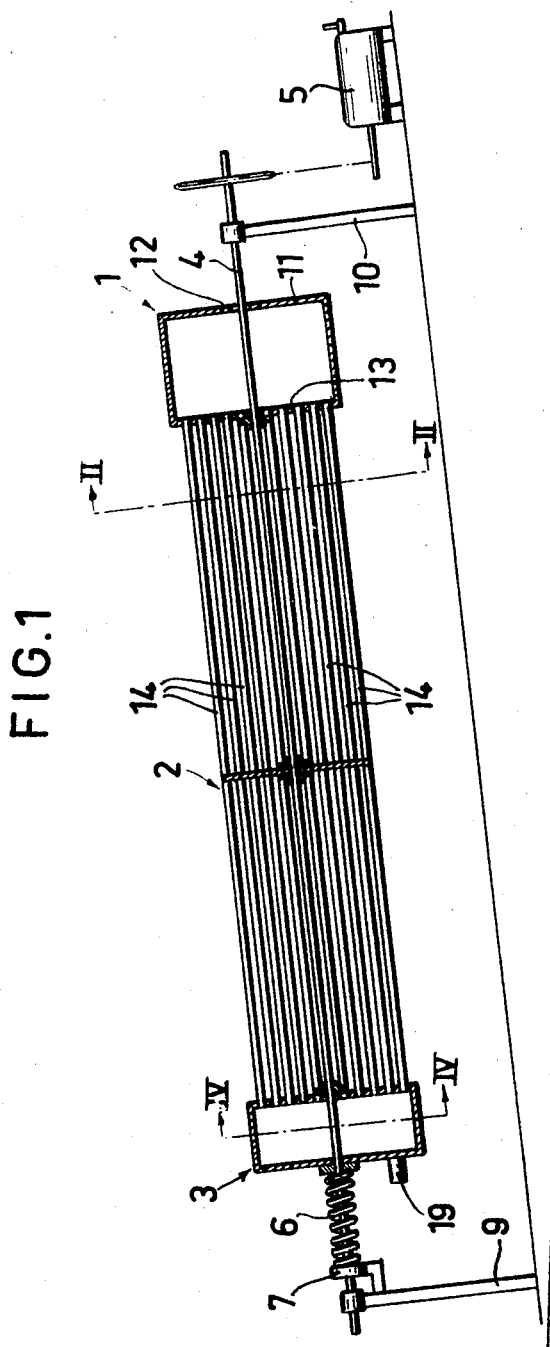
FIG. 1 shows a side view of one arrangement according to the invention, in which the accumulation effect is used, which is obtained from a flow of a liquid relative to a casing.
Figure 2:
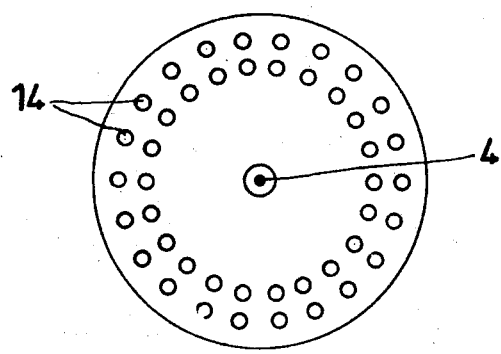
FIG. 2 shows a section acording to the line II—II in FIG. 1.
Figure 3:
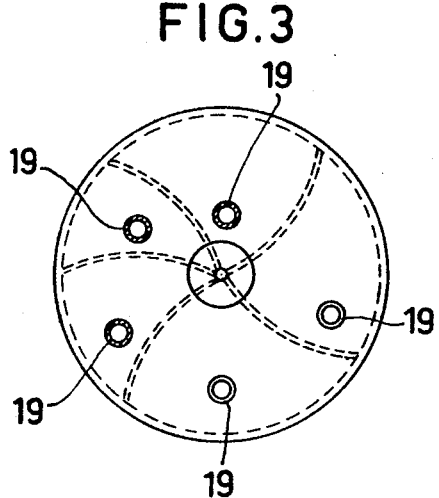
FIG. 3 shows an end view of a fraction collector arranged at the end of the arrangement according to FIG. 1.
Figure 4:
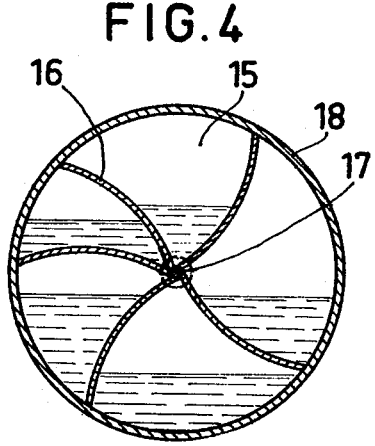
FIG. 4 shows a section through the fraction collector according to the line IV—IV in FIG. 1.

The arrangement according to FIGS. 1 to 4 consists essentially of an entrance chamber 1 for the suspension, a bundle of tubes 2 for the flow of the suspension and the simultaneous fractionation of the latter, and a fraction collector 3 in which the different fractions are collected. The entrance chamber 1 and the bundle of tubes 2 are arranged on a shaft 4 which is driven by a motor 5 via a suitable transmission. The fraction collector 3, on the other hand, is stationary and has a bearing for the shaft 4 and is pressed against one side of the bundle of tubes by a spring 6, which is arranged concentrically relative to the shaft 4 and between the fraction collector 3 and a ball bearing 7 fastened to the shaft 4. The shaft 4 has a bearing on the frame 9 and 10. It is arranged at an angle to the horizontal to obtain the flow through the bundle of tubes 2. The arrangement can, of course, be equipped with a fan or a pump for the same purpose, although this has not been shown.

The entrance chamber 1 of the design example shown consists of a cylinder, the inner circular section of which is the same as the section of the bundle of tubes 2. The free plane end 11 of the cylinder has a central circular opening 12 for admission of the suspension to be treated. This inlet can be exchanged for an inlet via the shaft 4. The other end 13 of the inlet cylinder is open to the tubes of the bundle of tubes 2.

The bundle of tubes 2 of the design example shown consists of a number of straight parallel tubes 14 parallel to the shaft and arranged in circles concentrically around the shaft, the former having their ends open to the entrance chamber 1 and the fraction collector 3. The tubes 14 are shown with a circular cross section but other shapes of the cross section can, of course, be used.

In the design example also the fraction collector 3 consists of a cylinder, having the same inner circular cross section as the entrance chamber 1. It is, as shown best in FIG. 4, divided into a number of sections 15, separated by preferably adjustable walls or scrapers 16 situated between the bearing 17 and the mantle 18 of the fraction collector. The walls have been given a curved shape, the reason for which will be discussed further on in the description.

The arrangement shown in FIGS. 1 to 4 works in the following manner:

The suspension to be treated is admitted into the inlet chamber 1 but only to a certain level, so that there is room above the suspension for another phase, in the design example consisting of a gas, preferably air. During the rotation the tubes 14 will be periodicaly filled with "plugs" of the suspension separated by the gas. When the plugs of the suspension flow through the tubes, the accumulation effect mentioned in the introduction occurs, and plugs are obtained having a high concentration of the suspended or dissolved material in the leading end of the plugs. The concentration diminishes towards the trailing end of the plugs and in the trailing end of the plugs it is close to zero. The walls or scrapers 16 of the fraction collector 3 are used to obtain the desired parts of the plugs, whereby in the different sections 15 fractions of different concentrations are collected. The curved arrangements of the walls or scrapers 16 makes it possible to obtain fractions of the same concentration from the tubes independent of their distance from the shaft. If an arrangement using a back pressure is used the walls or scrapers can be radially or almost radially arranged. The fractions collected in the different sections 15 can be obtained through pipes 19.

The composition of the fractions and the capacity of the arrangement depends on the outer and inner dimensions and the length of the tubes, the angle of inclination and the speed of revolution. The highest utilization of capacity is obtained with the closest packing of the tubes, accounting for their outer dimensions and the dimensions of the tube bundle.

Examples of the efficiency of the arrangement shown in FIGS. 1 to 4 are reproduced in the following. The results shown refer to experiments with pulp suspensions flowing through tubes having an inner diameter of 6.0 mm. and at a flow rate of 0.42 liter per minute per tube. The other experimental conditions were:

Tube length=1.00 m.
Length of the suspension plug in the tube=0.50 m.
Fibre concentration at inlet=0.40 g./l.
Temperature=20° C.

The results are collected in Table 1.

TABLE 1

| | Fraction of plug volume, percent | Concentration, g./l. | Fraction of fibre weight, percent |
|---|---|---|---|
| Fraction I | 10.5 | 1.9 | 49.9 |
| Fraction II | 39.5 | 0.40 | 39.5 |
| Fraction III | 50.0 | 0.088 | 10.7 |

In similar experiments where the inner diameter of the tubes was 8.0 mm. the results shown in Table 2 were obtained. Experimental conditions:

Flow rate=0.41 l./min./tube.
Fibre concentration at inlet=0.50 g./l.
Tube length=1.00 m.
Length of the suspension plug in the tube=0.40 m.
Temperature=20° C.

TABLE 2

| | Fraction of plug volume, percent | Concentration, g./l. | Fraction of fibre weight, percent |
|---|---|---|---|
| Fraction I | 12.5 | 1.9 | 47.5 |
| Fraction II | 37.5 | 0.52 | 39.0 |
| Fraction III | 50.0 | 0.13 | 13.0 |

The fractions I, II and III, as appear in Tables 1 and 2, were obtained by splitting the suspension plugs according to the following schematic drawing.

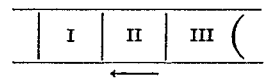

As is apparent from the results shown in Tables 1 and 2 a substantial and from an economical point of view interesting separation or enrichment effect is obtained at a comparatively small length of the tube where the treated fluid flows. The degree of separation could be brought close to the theoretical maximum by proper selection of tube length, suspension plug length and flow rate. It was found that increased separation was obtained using low values of the plug length/tube length ratio and at low flow velocities. Increased flow velocity was accompanied by a decreased degree of separation. It was found that the degree of separation was more effective the smaller the tube diameter. Measurements using tube diameters of the same order of magnitude as the particle size could not be performed. When the tube diameter is increased the lower efficiency of the arrangement can be partly compensated for by proper selection of flow velocity and tube length.

In an arrangement according to the invention with flow of suspension plugs through several straight tubes which might be arranged as in the example shown and discussed above but also in other arrangements for obtaining a continuous arrangement, there can, of course, be arranged other special gear, for instance sector shaped blowing boxes for the periodic admission of suspension and some other phase. The fraction collector, according to the invention, designed as in the design example or in other suitable ways, can be arranged so that it can be rotated and synchronized with the gear for admission of the suspension.

As was mentioned previously the accumulation effects of the kind described above can be obtained not only during the flow of liquids or suspensions or fluid systems through a sourrounding casing, as for instance a tube, but also in such cases when a casing, for instance a tube or channel, is made to move relative to a fluid grossly at rest. An arrangement according to this principle is shown in FIG. 5.

The casing in this case consists of the annulus shaped channel 20, formed between two concentrically arranged cylinders 21 and 22. The cylinders are arranged so that they can be rotated in the same direction around a shaft 23, driven in a suitable manner and having bearings fastened to the frame 24, 25. One of the plane end walls of the outer cylinder has a central opening 26, through which the suspension is admitted. The suspension passes through the channel 20 in the shape of an annulus sector forming fractions in the cross direction of the channel. These fractions are collected in a fraction collector 27, which is stationary and shaped as a continuation of the channel 20 but need only cover an angle $v_1$ which is larger than the central angle of the fluid annular sector. The fraction collector contains cross walls 28 forming different sections 29 for separation of the different fractions. The number of cross walls can be varied to obtain the number of sections 29 corresponding to the desired number of fractions. The cross walls should preferably be adjustable sideways. For collection of the different fractions pipe connections 30 are suitably arranged. Scrapers 31 are arranged in the channel 20 for scraping off fluid carried on the walls of the cylinders 21, 22.

Figure 5:
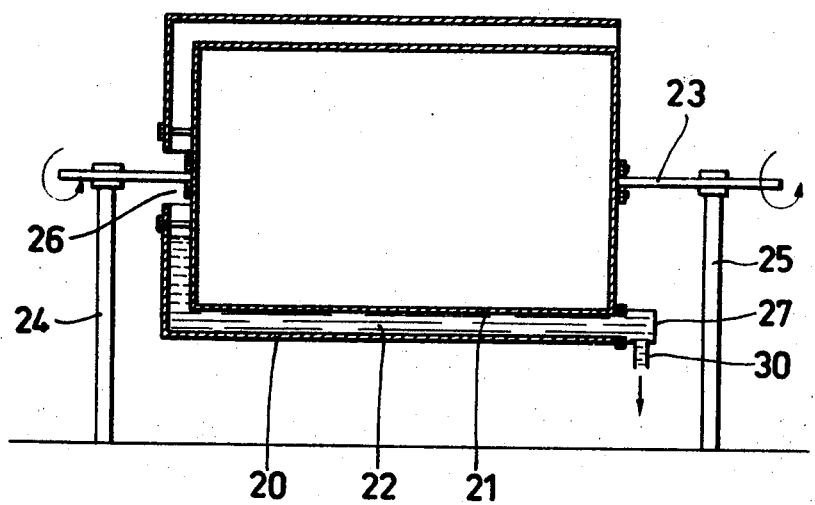
FIG. 5 shows a lengthwise section through another example of a design of an arrangement according to the invention utilizing the accumulation effect which is obtained by the motion of the casing relative to a liquid.
Figure 6:
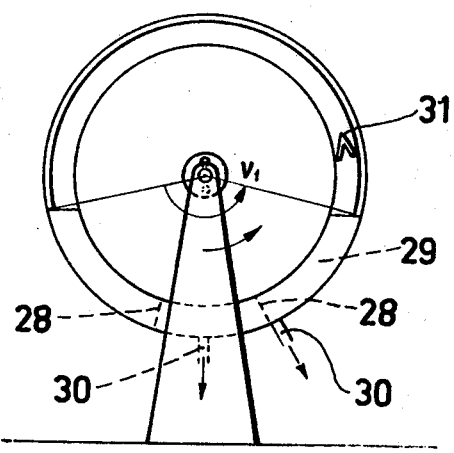
FIG. 6 shows an end view of the arrangement according to FIG. 5.

Using the arrangement shown in FIGS. 5 and 6 results of fractionation were obtained which largely agreed with those obtained with the arrangement according to FIGS. 1 to 4. The flow stability could be increased by arranging tangentially directed baffles (not shown) on the inner cylinder. In this way the efficiency of the arrangement could be increased. It is, of course, possible, for adaptation to different cases of separation, to vary the speed of rotation, annulus width, flow velocity and annulus length in a suitable way. The annulus width need not be constant along the whole length. It is also possible to arrange other gear for the admission and collection of fluid and fractions, whereby for instance fractions with different concentration can be obtained at different positions along the circumference of the annular space.

In one arrangement, which has been built, the outer cylinder was stationary while the inner cylinder rotated. In this case the separation was not as effective due to the influence of the stationary outer wall. In this design the arrangements for the admission and collection of fluid could be very simply arranged.

Figure 7:
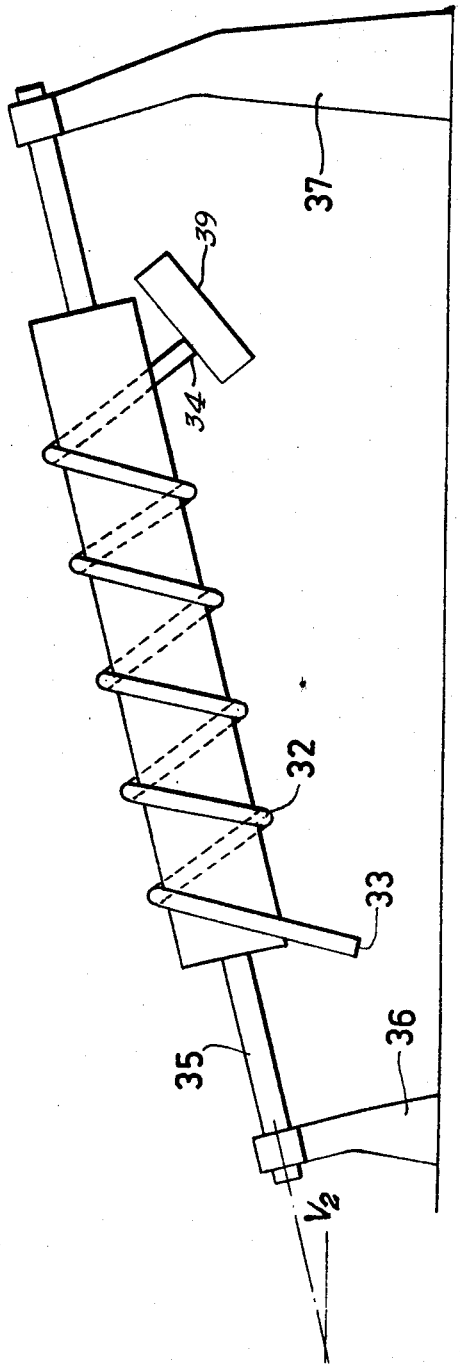
FIG. 7 shows a side view of one more example of an arrangement according to the invention in which, as in the arrangements according to FIGS. 5 and 6, the casing moves relative to a liquid.

Another arrangement, working according to the same principle as the one shown in FIGS. 5 and 6, is shown in FIG. 7. The arrangement consists of a tube helix 32, which is open at both ends 33 and 34, respectively, and is arranged so that it can be rotated around a shaft 35 coinciding with the helix axis. The shaft 35 is carried in two supports 36 and 37 and is arranged at an angle $v_2$ to the horizontal. The angle $v_2$ is less than the angle of pitch of the helix. A vessel (not shown) containing the suspension is arranged so that one tube end 33 at the lower end of the helix is submerged during a part of each revolution. The fluid fills only a part of each turn of the helix and fractionation is obtained in the so separated fluid segments. When the flow exits separation of the fluid segments in two or more fractions is, for instance, obtained by arranging dividing walls in a fraction collector 39, which should preferably be stationary arranged at the upper end of the helix.

For certain separations several of the arrangements covered by the invention may be used in a cascade. The arangements can also be used in combination with conventional processes, whereby the reclamation or separation processes can be better adapted to the separation problem at hand. Such combinations might also make it possible to lower the cost of the whole operation.

What we claim is:

1. An apparatus for separation and fractionation of material dissolved or suspended in a liquid which apparatus utilizes the accumulating effect obtained as a consequence of relative motion between the liquid and a casing which encloses said liquid to achieve said separation and fractionation which comprises a casing consisting of at least one channel having an entrance end provided with means for obtaining flow through said channel by periodically admitting to the entrance end plugs of a liquid having material dissolved or suspended therein, the plugs being separated by quantities of another phase selected from the group consisting of a gas, liquid, and a solid, means to effect said relative motion between said liquid having dissolved or suspended material therein and said casing, and an exit end provided with a fraction collector means for selectively collecting fractions of varying concentration obtained by the accumulation effect on each separated liquid plug.

2. An apparatus according to claim 1, wherein means is provided to effect relative motion between said collector and the exit end of the channels and wherein said collector is divided into a number of separated sections corresponding to the number of fractions which are to be collected from each liquid plug.

3. An apparatus according to claim 2, wherein the relative motion for obtaining the accumulation effect results from the motion of the casing relative to the liquid suspension, and wherein the casing consists of at least one helically shaped channel adapted to be rotated about a shaft coincident with the helix axis, and wherein one end of said channel is adapted to be submerged in the liquid suspension during a part of each revolution.

4. An apparatus according to claim 3, wherein the shaft is arranged at an angle to the horizontal.

5. An apparatus according to claim 4, wherein the pitch of the helix is greater than the angle of inclination of the shaft.

6. An apparatus according to claim 2, wherein the casing consists of an annular shaped channel formed between two concentric cylinders at least one of said cylinders being adapted to be rotated whereby the liquid suspension is caused to flow through said channel and wherein the fraction collector is arranged at one plane end wall of the cylinders.

7. An apparatus according to claim 6, wherein the fraction collector is stationary and forms a continuation of the annular shaped channel beyond the plane end wall of the cylinders and wherein said collector covers a circular sector which encompasses and is greater than the circular sector filled by the liquid suspension in the annular channel, and wherein said collector is divided into a number of sections by cross walls, extending in a generally radial direction from the shaft to the outer surface of the fraction collector.

8. Apparatus according to claim 2, characterized in that the channel is formed curved around an axis of rotation and that the entrance end of the channel upon rotation is adapted to be submerged in the liquid for the introduction of the liquid and the other phase.

9. Apparatus according to claim 8, characterized in that the channel is helical.

10. Apparatus according to claim 9, characterized in that the axis of rotation is arranged at an angle to the horizontal.

11. Apparatus according to claim 2, characterized in that the channel is annular-shaped and formed of the space between at least two cylinders, at least one adjacent cylinder being adapted to be rotated, whereby the liquid in an annular section shape is passing through the channel to form the fractions.

12. Apparatus according to claim 11, characterized in that the fraction collector is located at one end wall of the cylinders.

13. Apparatus according to claim 12, characterized in that the fraction collector is stationary and is formed as an extension of the annular channel between the cylinders and covers an angle greater than the angular section of the liquid and is sub-divided into a number of sectors, corresponding to the number of fractions by partition walls.

14. Apparatus according to claim 2, and in which at least two parallel channels are arranged, characterized in that the channels consist of tubes mounted for rotation around a shaft parallel to the tubes, the tubes being connected at their enrance ends to an entrance chamber through which the liquid is introduced.

15. Apparatus according to claim 14, characterized in that the entrance chamber comprises a cylinder mounted to rotate around the shaft and having a cross-sectional area at least equal to the cross-sectional area of the tube bundle.

16. Apparatus according to claim 15, characterized in that the fraction collector at the exit end of the tubes comprises a stationary cylinder arranged concentric with the shaft, the cylinder being sub-divided into sections by partition walls extending from the center to the outer wall surface of the cylinder, and wherein the walls are so shaped that fractions of the same concentration are obtained from the tubese irrespective of their radial distance from the shaft.

17. Apparatus according to claim 2, characterized in that the sections in the fraction collector are provided with means for the discharge of the different fractions.

18. An apparatus according to claim 2, wherein the casing comprises at least two parallel tubes which are adapted to be rotated around a shaft parallel to said tubes and wherein an entrance chamber adapted to receive the liquid containing dissolved or suspended material is connected to the entrance end of said tubes.

19. An apparatus according to claim 18, wherein the tubes are arranged at an angle to the horizontal and wherein the entrance chamber is raised in relation to the fraction collection chamber.

20. An apparatus according to claim 18, wherein the tubes are arranged in concentric cylindrical planes, the axis of said cylindrical planes coinciding with the shaft parallel to said tubes and wherein the entrance chamber consists of a cylinder adapted to rotate about said shaft and having a cross-sectional area at least equal to the cross-sectional area of the tube bundle and wherein the entrance chamber is adapted to keep the liquid in said chamber at the same level as the shaft.

21. An apparatus according to claim 20, wherein the fraction collector arranged at the exit ends of said tubes consists of a stationary cylinder arranged concentrically with the shaft and is carried on the shaft by means of a bearing, and wherein the sections of the fraction collector are formed by walls extending in a generally radial direction from the bearing to the outer surface of the cylindrical collector, and wherein the collector walls are so shaped that fractions of the same concentration are obtained from separate tubes irrespective of the distance of the individual tube from the central shaft.

22. An apparatus according to claim 21, wherein the fraction collector is provided with an end wall opposite the tube ends said wall having a pipe connection attached to each fraction collector section.

23. An apparatus according to claim 22, wherein the tubes are arranged at an angle to the horizontal and wherein the entrance chamber is raised in relation to the fraction collection chamber.

References Cited

UNITED STATES PATENTS

| | | | |
|---|---|---|---|
| 1,046,447 | 12/1912 | Delamater | 210—322 X |
| 1,586,609 | 6/1926 | Chance | 210—513 X |
| 2,190,596 | 2/1940 | Dorr | 210—49 |
| 2,413,375 | 12/1946 | Pomeroy | 210—83 X |
| 3,233,742 | 2/1966 | Shaines et al. | 210—83 X |

REUBEN FRIEDMAN, *Primary Examiner.*

F. SPEAR, *Assistant Examiner.*